(12) United States Patent
Ancora et al.

(10) Patent No.: US 8,315,151 B2
(45) Date of Patent: Nov. 20, 2012

(54) RADIO COMMUNICATION SYSTEM

(75) Inventors: Andrea Ancora, Nice (FR); Matthew Baker, Kent (GB)

(73) Assignee: ST-Ericsson SA, Geneva (CH)

( * ) Notice: Subject to any disclaimer, the term of this patent is extended or adjusted under 35 U.S.C. 154(b) by 918 days.

(21) Appl. No.: 12/161,095

(22) PCT Filed: Jan. 17, 2007

(86) PCT No.: PCT/IB2007/050155
§ 371 (c)(1),
(2), (4) Date: Jul. 16, 2008

(87) PCT Pub. No.: WO2007/083272
PCT Pub. Date: Jul. 26, 2007

(65) Prior Publication Data
US 2010/0159914 A1    Jun. 24, 2010

(30) Foreign Application Priority Data

Jan. 18, 2006 (EP) .................................. 06300039
Aug. 23, 2006 (EP) .................................. 06300885

(51) Int. Cl.
*H04J 11/00* (2006.01)
*H04B 7/208* (2006.01)
*H04L 27/28* (2006.01)

(52) U.S. Cl. ................ 370/208; 370/344; 375/260

(58) Field of Classification Search ................. None
See application file for complete search history.

(56) References Cited

U.S. PATENT DOCUMENTS

| | | | |
|---|---|---|---|
| 6,816,453 B1 * | 11/2004 | Sakamoto | 370/210 |
| 6,990,153 B1 * | 1/2006 | Farhang-Boroujeni et al. | 375/260 |
| 7,139,320 B1 * | 11/2006 | Singh et al. | 375/260 |

(Continued)

FOREIGN PATENT DOCUMENTS

WO    WO 2005/022815 A1 *   3/2005

(Continued)

OTHER PUBLICATIONS

Ning Chen et al; "A Superimposed Period Pilot Scheme for Semi-Blind Channel Estimation of OFDM Systems", Digital Signal Processing Workshop, 2002 and the 2nd Signal Processing Education Workshop. Proceedings of 2002 IEEE 10th, Oct. 13-16, 2002, Piscataway, NJ, USA, IEEE, pp. 362-365.

(Continued)

*Primary Examiner* — Chirag Shah
*Assistant Examiner* — Suk Jin Kang
(74) *Attorney, Agent, or Firm* — William J. Kubida; Peter J. Meza; Hogan Lovells US LLP

(57) ABSTRACT

A transmitting station (TS), for transmitting a plurality of symbols of a data signal in a communication system, comprises a process module (PM) arranged for adding subset of the symbols of the data signal to symbols of a predetermined signal prior to proceed to transmission of the data signal.

20 Claims, 1 Drawing Sheet

U.S. PATENT DOCUMENTS

| | | | |
|---|---|---|---|
| 7,590,188 B2 * | 9/2009 | Giannakis et al. | 375/295 |
| 7,848,443 B2 * | 12/2010 | Pirak et al. | 375/267 |
| 7,869,760 B2 * | 1/2011 | Nishio | 455/22 |
| 2002/0181390 A1 * | 12/2002 | Mody et al. | 370/208 |
| 2003/0016645 A1 * | 1/2003 | Siala et al. | 370/342 |
| 2004/0066754 A1 * | 4/2004 | Hottinen | 370/252 |
| 2005/0100108 A1 * | 5/2005 | Yun et al. | 375/260 |
| 2005/0254556 A1 * | 11/2005 | Fujii et al. | 375/144 |
| 2006/0028976 A1 * | 2/2006 | Park et al. | 370/203 |
| 2006/0072450 A1 * | 4/2006 | Miyoshi et al. | 370/205 |
| 2006/0120275 A1 * | 6/2006 | Muck et al. | 370/210 |
| 2007/0053282 A1 * | 3/2007 | Tong et al. | 370/208 |
| 2007/0217531 A1 * | 9/2007 | Kwon et al. | 375/260 |
| 2008/0043857 A1 * | 2/2008 | Ribeiro Dias et al. | 375/260 |
| 2010/0159914 A1 | 6/2010 | Ancora et al. | |

FOREIGN PATENT DOCUMENTS

WO    WO 2005/096579 A1 * 10/2005

OTHER PUBLICATIONS

Ohkubo, N. and Ohtsuki, T., "Added Pilot Semi-Blind Iterative Channel Estimation for OFDM Packet Transmission," Globecom 2003; IEEE 2003, pp. 878-882.

Ohkubo, N. and Ohtsuki, T., "Added Pilot Semi-Blind Iterative Channel Estimation for OFDM Packet Transmission," Institute of Electronics, Information, and Communication Engineers, NII-Electronic Library Services, 2003, pp. 33-39.

Japanese Office Action with English translation for app. No. 2008-549975, mailed Dec. 2, 2011, pp. 10.

* cited by examiner

RADIO COMMUNICATION SYSTEM

BACKGROUND OF THE INVENTION

Pilot symbols are needed in OFDM communication systems in order for the receiver to undertake channel estimation. Known methods of multiplexing the pilot symbols with the data symbols include time-multiplexing (i.e. allocating certain symbols to pilot signals rather than data), frequency-multiplexing (i.e. using only certain sub-carriers for pilot signals, and other sub-carriers for data), and pilot superimposition (i.e. adding a pilot signal to the data and transmitting the combination of pilot and data in the same symbols, where the pilot signal is selected to facilitate separation from the data signal).

Superimposed pilots have the advantage of allowing the pilot signals to be spread throughout the time-frequency space occupied by the signal, thus facilitating channel estimation in high-Doppler or rapidly-varying channels.

In static channel conditions, channel estimation using superimposed pilots is more complex to implement than using time- or frequency-multiplexed pilots. Consequently, in some systems such as the Long-Term Evolution of UMTS, it is desirable to combine the use of time-multiplexed pilot symbols with the possibility to use superimposed pilots using a common structure.

OBJECT AND SUMMARY OF THE INVENTION

The invention proposes a method of operating a communication system (comprising a transmitting station and a receiving station), comprising at the transmitting station transmitting a plurality of symbols of a data signal, adding a subset of symbols of data signal to symbols of a predetermined signal prior to transmit this data signal.

The method according to the invention may include additional characteristics considered separately or combined, and notably:
- the subset of the symbols of the data signal may be multiplied by a first weighting factor prior to the addition;
- when the transmission takes place in radio frames, the first weighting factor may be selected so that the average transmitted power in a radio frame of the symbols containing the predetermined signal is substantially the same as the average transmitted power of the symbols containing only the data signal in the radio frame;
- the symbols of the predetermined signal may be weighted by a second weighting factor prior to the addition;
- when the transmission takes place in radio frames, the second weighting factor may be selected so that the average transmitted power in a radio frame of the symbols containing the predetermined signal is substantially the same as the average transmitted power of the symbols containing only the data signal in the radio frame;
- the used value of the first and/or second weighting factor(s) may be signalled to the receiving station by the transmitting station;
- a recommended value of the first and/or second weighting factor(s) may be signalled to the transmitting station by the receiving station;
- the used value of the first and/or second weighting factor(s) may be a function of one or more of the following:
  transmitted data rate,
  quality of service requirements for the transmitted data,
  type of transmitted data,
  instantaneous radio channel quality,
  average radio channel quality,
  coherence time of the radio channel,
  coherence bandwidth of the radio channel,
  available transmit power of the transmitting station,
  decoding capability of the receiving station.
- the transmission preferably uses an orthogonal frequency-division multiplexing.

The invention also proposes a transmitting station, for transmitting a plurality of symbols of a data signal in a communication system (further comprising at least one receiving station), and comprising a process module arranged for adding subset of the symbols of the data signal to symbols of a predetermined signal prior to proceed to transmission of this data signal.

The transmitting station according to the invention may include additional characteristics considered separately or combined, and notably:
- its process module may be arranged for multiplying the subset of the symbols of the data signal by a first weighting factor prior proceeding to the addition;
- it may be arranged for transmitting the symbols in radio frames. In this case, its process module may be arranged for multiplying the subset by a first weighting factor selected in order the average transmitted power in a radio frame of the symbols containing the predetermined signal is substantially the same as the average transmitted power of the symbols containing only the data signal in the radio frame;
- its process module may be arranged to weight the symbols of the predetermined signal by a second weighting factor prior proceeding to the addition;
- when it is arranged for transmitting the symbols in radio frames, its process module may be arranged for weighting the symbols of the predetermined signal by a second weighting factor selected in order the average transmitted power in a radio frame of the symbols containing the predetermined signal is substantially the same as the average transmitted power of the symbols containing only the data signal in the radio frame;
- it may be arranged for signalling the value of the first and/or weighting factor(s), used by its process module, to the receiving station;
- its process module may be arranged to use a value of the first and/or weighting factor(s) recommended by the receiving station;
- it is preferably arranged for using an orthogonal frequency-division multiplexing.

BRIEF DESCRIPTION OF THE DRAWINGS

Other features and advantages of the invention will become apparent on examining the detailed specifications hereafter and the appended drawings, wherein FIG. 1 schematically and functionally illustrates an example of embodiment of a transmitting station according to the invention, FIG. 2 schematically illustrates an example of application of a super-imposed pilot.

The appended drawings may not only serve to complete the invention, but also to contribute to its definition, if need be.

DESCRIPTION OF EMBODIMENTS

Figure 1:
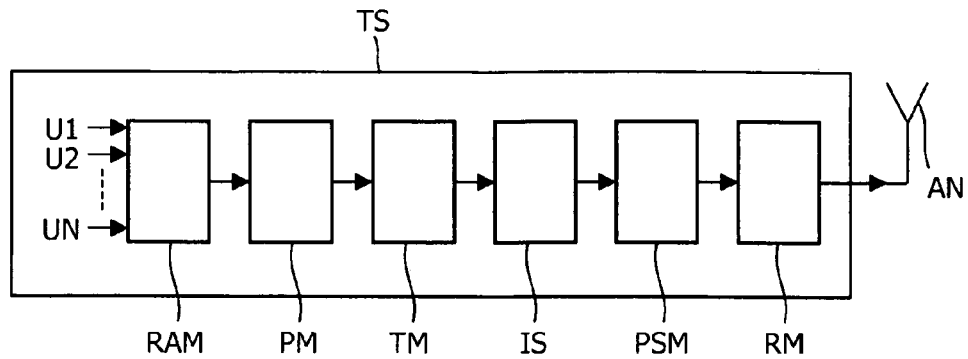

The invention can be implemented into a transmitting station TS such as the one schematically and functionally illustrated in FIG. 1.

In the following description it will be considered that the transmitting station TS is an OFDM Node B (or base station) of a radio access network of a mobile network, such as an UMTS one.

As illustrated an OFDM ("Orthogonal Frequency Division Multiplexing") transmitting station TS, according to the invention, comprises a resource allocation module RAM, a process module PM, a transformation module TM, an insertion module IS, a pulse shaping module PSM, a radiofrequency module RM and an antenna AN.

The resource allocation module RAM is arranged to allocate some network radio resources to the different user equipments Ui (i=1 to N) that are momentarily connected to its transmitting station TS and to which data must be transmitted.

The process module PM is the part of the transmitting station TS which implements the invention that will be described below.

The transformation module TM is a module specific to the OFDM systems. It is intended to carry out an inverse fast fourier transform (IFFT) onto the multiplexed data outputted by the process module PM.

The insertion module IS is arranged to mitigate the effect of the delay spread of the communication onto the signal outputted by the transformation module TM.

The pulse shaping module PSM is arranged to carry out a pass-band filtering onto the signal outputted by the insertion module IS in order it belongs to a chosen spectral band (i.e. be compatible with a spectral mask defined by the concerned communication standard).

The radiofrequency module RM is arranged to carry out a baseband modulation around a chosen carrier frequency onto the signal outputted by the pulse shaping module PSM, before feeding the antenna AN.

In conventional OFDM transmitting station, the reference signalling (pilot symbols) is multiplexed in an orthogonal fashion (i.e. dedicated resources for pilot symbols) but consuming system resources for this purpose. The invention proposes to multiplex, into the process module PM, some of the reference signalling (i.e. $2^{nd}$ reference signal) in a non-orthogonal way in order to save system resources.

According to the invention, a pattern of pilot symbols is superimposed (by the process module PM) on an OFDM data signal, whereby the pilot symbols are superimposed on only a predetermined subset of the symbols on a predetermined subset of the OFDM subcarriers, and the superimposition is carried out using a configurable weighting parameter allowing the pilot-to-data transmit power ratio to be adjusted in the symbols containing superimposed pilot signals.

The invention therefore enables the balance between resources used for data transmission and resources used for pilot transmission to be flexibly adjusted without affecting the basic interpolation pattern for channel estimation.

Advantageously, the superimposition of the pilot symbols is carried out by the process module PM such that the total transmitted power per symbol is the same in symbols containing superimposed pilot signals as in symbols containing only data signals.

The process module PM may use first and/or second weighting factor(s).

For instance the process module PM may multiply the subset of the symbols of the data signal by a first weighting factor prior proceeding to the addition. In other words, the first weighting factor allows to set the quantity of power which is assigned (or allocated) to the pilot compared to the quantity of power which is assigned (or allocated) to the subset of data signal where the transmission of the pilot takes place. For this purpose, the process module PM may, for instance, multiply the subset of the symbols of the data signal by a first weighting factor which is chosen in order the average transmitted power in a radio frame of the symbols containing the predetermined signal is substantially the same as the average transmitted power of the symbols containing only the data signal in the radio frame.

The process module PM may also weight the symbols of the predetermined signal by a second weighting factor prior proceeding to the addition. In other words, the second weighting factor allows to set the quantity of power which is assigned (or allocated) to the symbols representing the data with the superimposed pilot compared to the quantity of power which is assigned (or allocated) to the remaining data signal. For this purpose, the process module PM may, for instance, weight the symbols of the predetermined signal by a second weighting factor which is chosen in order the average transmitted power in a radio frame of the symbols containing the predetermined signal is substantially the same as the average transmitted power of the symbols containing only the data signal in the radio frame.

Optionally, the first and/or second weighting factor(s) to be used may be signalled to the process module PM of the transmitting station TS by the receiving station.

Optionally, the first and/or second weighting factor(s) selected by the process module PM of the transmitting station TS may be signalled to the receiving station in order to assist in the decoding process.

Optionally, the first and/or second weighting factor(s) may be set as a function of one or more of the following:
  transmitted data rate,
  quality of service requirements (e.g. latency requirements) for the transmitted data,
  type of transmitted data,
  instantaneous radio channel quality,
  average radio channel quality,
  coherence time of the radio channel,
  coherence bandwidth of the radio channel,
  available transmit power of the transmitting station,
  decoding capability of the receiving station.

Optionally, further time- or frequency-division multiplexed pilot symbols may be transmitted by the transmitting station TS in other symbols not containing data or superimposed pilots.

The technique (implemented by the process module PM) consists of adding a known pilot sequence of constant modulus and zero-mean, such as a pseudo-noise sequence p(n), onto data to be transmitted d(n).

The corresponding signal model of the compound symbol is given by:

$$y(n)=\sqrt{\rho}\cdot p(n)+\sqrt{1-\rho}\cdot d(n)$$

with $$E\{p(n)\}=0 \text{ and } |p(n)|^2=1$$

The design parameter p controls the amount of power allocated to the pilot signal, or Pilot-to-Signal power Ratio (PSR), assuming the constraint of unitary power of the resulting compound symbol, for simplicity and to ensure that the overall PAPR ("Pic to Average Power Ratio") of the transmitted signal is not affected.

Figure 2:
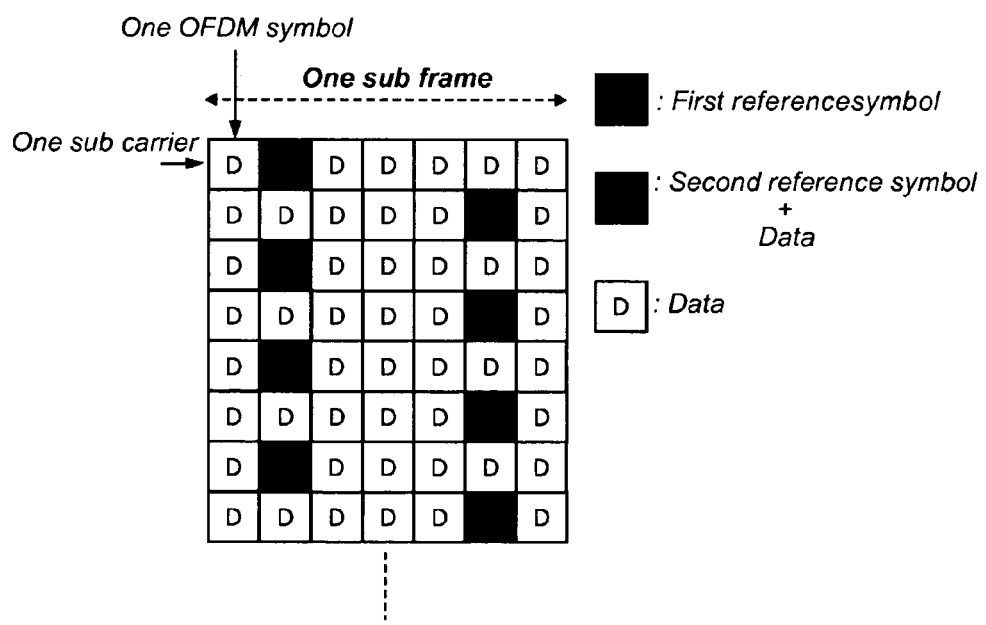

FIG. 2 depicts a non limiting example of application of the super-imposed pilot based in the context of the assumptions defined for the Long-Term Evolution of UMTS.

In this illustrated example, the first reference symbols are conventional time- and frequency-division multiplexed pilot symbols in which no data information is transmitted. The second reference symbols are superimposed pilot symbols transmitted by weighted combination with data symbols in accordance with the invention.

The parameter p can take values depending on the required performance or operating conditions.

This technique (implemented by the process module PM) provides an additional degree of freedom in downlink resource allocation (carried out by the resource allocation module RAM) to be able to flexibly support the different operating scenarios for a mobile communications system (e.g. high Doppler channel, multi-antenna transmission, interpolation in case of preceding single-frequency network broadcast, higher order modulation).

The scheme is also able to cope with multiple mutually orthogonal downlink reference signals by properly choosing orthogonal p(n) sequences.

This technique can also be used for both unicast and broadcast pilots.

The invention is not limited to the embodiments of transmitting station and method for operating a communication system described above, only as examples, but it encompasses all alternative embodiments which may be considered by one skilled in the art within the scope of the claims hereafter.

The invention claimed is:

1. A method of operating an OFDM communication system, further comprising a transmitting station and a receiving station, comprising at the transmitting station transmitting a plurality of symbols of a data signal, a subset of the symbols of the data signal are being added to symbols of a predetermined signal prior to IFFT conversion and transmission;

said method further being characterized in that a pattern of pilot symbols is superimposed on an OFDM data signal, whereby the pilot symbols are superimposed on only a predetermined subset of the symbols on a predetermined subset of the OFDM subcarriers, and the superimposition is carried out using a configurable weighting parameter allowing a pilot-to-data transmit power ratio to be adjusted in the symbols containing superimposed pilot symbols;

said superimposition using a configurable weighting parameter is based on the addition of a known pilot sequence p(n), onto data to be transmitted d(n) in order to generate a compound symbol defined in accordance with the formula:

$$y(n)=\sqrt{\rho}\cdot p(n)+\sqrt{1-\rho}\cdot d(n)$$

with $$E\{p(n)\}=0 \text{ and } |p(n)|^2=1$$

where parameter $\rho$ controls the amount of power allocated to the pilot signal, or Pilot-to-Signal power Ratio (PSR), and wherein said weighted combination is further based on a function of one or more of the following: transmitted data rate, quality of service requirements for the transmitted data, type of transmitted data, instantaneous radio channel quality, average radio channel quality, coherence time of the radio channel, coherence bandwidth of the radio channel, available transmit power of the transmitting station, or decoding capability of the receiving station.

2. The method as claimed in claim 1, wherein in said weighted combination the subset of the pilot symbols of the data signal is multiplied by a first weighting factor prior to the addition.

3. The method as claimed in claim 2, wherein the transmission takes place in radio frames, and wherein in said weighted combination the first weighting factor is selected so that an average transmitted power in a radio frame of the symbols containing the predetermined signal is substantially the same as an average transmitted power of the symbols containing only the data signal in the radio frame.

4. The method as claimed in claim 2, wherein in said weighted combination the value of the first weighting factor is signaled to the receiving station by the transmitting station.

5. The method as claimed in claim 2, wherein in said weighted combination a recommended value of the first weighting factor is signaled to the transmitting station by the receiving station.

6. The method as claimed in claim 1, wherein in said weighted combination the symbols of the predetermined signal are weighted by a second weighting factor prior to the addition.

7. The method as claimed in claim 6, wherein the transmission takes place in radio frames, and wherein in said weighted combination the second weighting factor is selected so that an average transmitted power in a radio frame of the symbols containing the predetermined signal is substantially the same as an average transmitted power of the symbols containing only the data signal in the radio frame.

8. The method as claimed in claim 6, wherein in said weighted combination the value of the second weighting factor is signaled to the receiving station by the transmitting station.

9. The method as claimed in claim 6, wherein in said weighted combination a recommended value of the second weighting factor is signaled to the transmitting station by the receiving station.

10. The method as claimed in claim 1, wherein in said weighted combination the transmission uses orthogonal frequency-division multiplexing.

11. A transmitting station for transmitting a plurality of OFDM symbols of a data signal in a communication system, further comprising at least one receiving station, said transmitting station comprising a process module arranged for adding a subset of the symbols of the data signal to symbols of a predetermined signal prior to IFFT conversion and to transmission of said data signal, the transmitting station further including:

means for superimposing a pattern of pilot symbols on an OFDM data signal, whereby the pilot symbols are superimposed on only a predetermined subset of the symbols on a predetermined subset of the OFDM subcarriers, means for carrying out the superimposition using a configurable weighting parameter allowing a pilot-to-data transmit power ratio to be adjusted in the symbols containing superimposed pilot signals;

said superimposition using a configurable weighting parameter is based on the addition of a known pilot sequence p(n), onto data to be transmitted d(n) in order to generate a compound symbol defined in accordance with the formula:

$$y(n)=\sqrt{\rho}\cdot p(n)+\sqrt{1-\rho}\cdot d(n)$$

with $$E\{p(n)\}=0 \text{ and } |p(n)|^2=1$$

where parameter $\rho$ controls the amount of power allocated to the pilot signal, or Pilot-to-Signal power Ratio (PSR), and wherein said weighted combination is further based on a function of one or more of the following: transmitted data rate, quality of service requirements for the transmitted data, type of transmitted data, instantaneous radio channel quality, average radio channel quality, coherence time of the radio channel, coherence bandwidth of the radio channel, available transmit power of the transmitting station, or decoding capability of the receiving station.

12. The transmitting station as claimed in claim 11, wherein in said weighted combination said process module is arranged for multiplying said subset of the symbols of the data signal by a first weighting factor prior proceeding to said addition.

13. The transmitting station as claimed in claim 12, characterized in that it is arranged for transmitting said symbols in radio frames, and wherein said process module is arranged for multiplying said subset by a first weighting factor selected in order an average transmitted power in a radio frame of the symbols containing the predetermined signal is substantially the same as an average transmitted power of the symbols containing only the data signal in the radio frame.

14. The transmitting station as claimed in claim 12, characterized in that it is arranged for signaling the value of the first weighting factor in said weighted combination, used by said process module, to the receiving station.

15. The transmitting station as claimed in claim 11, wherein in said weighted combination said process module is arranged to use a value of the a weighting factor recommended by the receiving station.

16. The transmitting station as claimed in claim 11, wherein said process module is arranged to weight said symbols of the predetermined signal by a second weighting factor prior proceeding to said addition.

17. The transmitting station as claimed in claim 16, wherein it is arranged for transmitting said symbols in radio frames, and wherein said process module is arranged for weighting said symbols of the predetermined signal by a second weighting factor selected in order an average transmitted power in a radio frame of the symbols containing the predetermined signal is substantially the same as an average transmitted power of the symbols containing only the data signal in the radio frame.

18. The transmitting station as claimed in claim 16, characterized in that it is arranged for signaling the value of the second weighting factor in said weighted combination, used by said process module, to the receiving station.

19. The transmitting station as claimed in claim 16, wherein in said weighted combination said process module is arranged to use a value of the second weighting factor recommended by the receiving station.

20. The transmitting station as claimed in claim 11, wherein it is arranged for using an orthogonal frequency-division multiplexing.

* * * * *

UNITED STATES PATENT AND TRADEMARK OFFICE
CERTIFICATE OF CORRECTION

PATENT NO. : 8,315,151 B2  
APPLICATION NO. : 12/161095  
DATED : November 20, 2012  
INVENTOR(S) : Andrea Ancora and Matthew Baker Page 1 of 1

It is certified that error appears in the above-identified patent and that said Letters Patent is hereby corrected as shown below:

Column 6, line 55, " $y(n) = \sqrt{\rho} \cdot p(n) + \sqrt{1-\rho} \cdot d(n)$ ,, should be -- $y(n) = \sqrt{\rho} \cdot p(n) + \sqrt{1-\rho} \cdot d(n)$ --

Signed and Sealed this
Twelfth Day of February, 2013

Teresa Stanek Rea
*Acting Director of the United States Patent and Trademark Office*